(12) United States Patent
Drexler et al.

(10) Patent No.: US 10,239,705 B2
(45) Date of Patent: Mar. 26, 2019

(54) CONVEYING DEVICE FOR CAN BLANKS

(71) Applicant: Hinterkopf GmbH, Eislingen/Fils (DE)

(72) Inventors: Stefan Drexler, Hausen-Bad Uberkingen (DE); Steffen Osswald, Geislingen (DE); Alan Goser, Deggingen (DE)

(73) Assignee: Hinterkopf GmbH, Eislingen/Fils (DE)

( * ) Notice: Subject to any disclaimer, the term of this patent is extended or adjusted under 35 U.S.C. 154(b) by 0 days.

(21) Appl. No.: 15/849,999

(22) Filed: Dec. 21, 2017

(65) Prior Publication Data

US 2018/0178989 A1  Jun. 28, 2018

(30) Foreign Application Priority Data

Dec. 22, 2016 (EP) .................................... 16206406

(51) Int. Cl.
| | | |
|---|---|---|
| *B65G 47/00* | (2006.01) | |
| *B65G 47/74* | (2006.01) | |
| *B65G 47/84* | (2006.01) | |
| *B65G 47/86* | (2006.01) | |
| *B65G 47/91* | (2006.01) | |

(52) U.S. Cl.
CPC ......... *B65G 47/847* (2013.01); *B65G 47/848* (2013.01); *B65G 47/915* (2013.01); *B65G 47/918* (2013.01); *B65G 2201/0252* (2013.01)

(58) Field of Classification Search
None
See application file for complete search history.

(56) References Cited

U.S. PATENT DOCUMENTS

| | | | |
|---|---|---|---|
| 3,602,357 A | 8/1971 | Schubert | |
| 4,009,776 A | 3/1977 | Skrypek et al. | |
| 8,091,471 B2 * | 1/2012 | Larsen | A21C 1/06 |
| | | | 219/388 |
| 8,807,330 B2 * | 8/2014 | Kraus | B65G 47/847 |
| | | | 198/478.1 |
| 9,188,385 B2 * | 11/2015 | Armellin | B05C 3/09 |
| 2007/0137982 A1 | 6/2007 | Momich | |

FOREIGN PATENT DOCUMENTS

| | | |
|---|---|---|
| DE | 4010601 | 10/1991 |
| DE | 102009029778 | 12/2010 |
| DE | 102012101076 | 8/2013 |
| EP | 0355971 | 2/1990 |
| EP | 1132207 | 9/2001 |
| NL | 1000675 | 12/1996 |
| WO | WO2006094807 | 9/2006 |
| WO | WO2012107172 | 8/2012 |

\* cited by examiner

*Primary Examiner* — Kavel Singh
(74) *Attorney, Agent, or Firm* — Hoffmann & Baron, LLP

(57) ABSTRACT

A conveyor for can blanks, having a machine frame, on which at least one conveyor drum is supported so that it can rotate about an axis of rotation, wherein the conveyor drum on an external circumferential surface is provided with a plurality of can holders in each case supported parallel to the axis of rotation so that they can move linearly, and having at least one actuator system associated with the conveyor drum, configured to impart a linear movement to at least one can holder. It is provided that the at least one actuator system is configured to provide the linear movement of the at least one can holder as a predefinable function of a rotational position of the conveyor drum in relation to the machine frame.

14 Claims, 5 Drawing Sheets

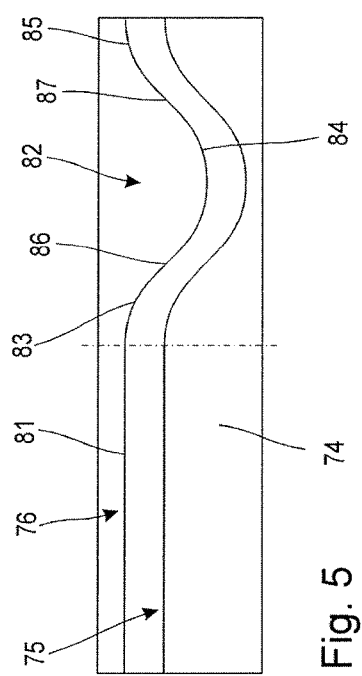
Fig. 5
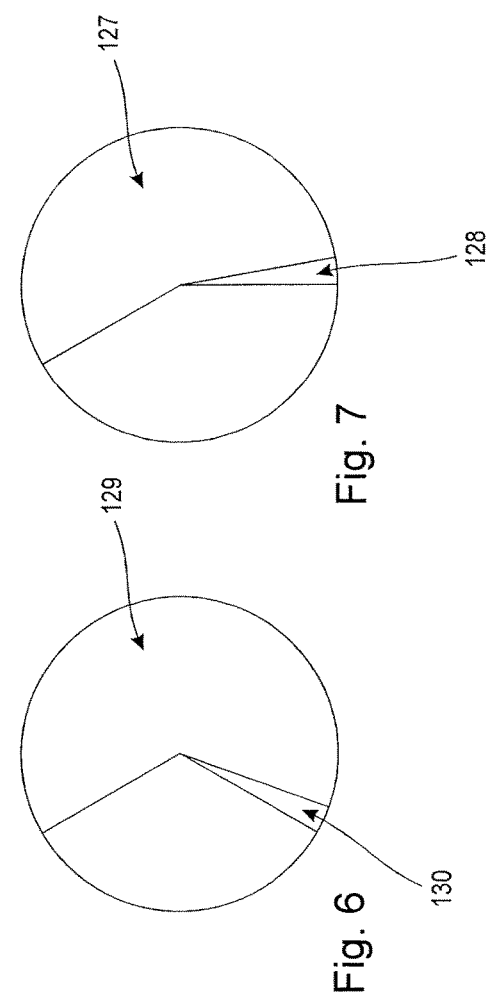
Fig. 7
Fig. 6

CONVEYING DEVICE FOR CAN BLANKS

BACKGROUND OF THE INVENTION

The invention relates to a conveyor for can blanks, having a machine frame, on which at least one conveyor drum is supported so that it can rotate about an axis of rotation, wherein the conveyor drum is provided with a plurality of can holders which are supported on an external circumferential surface of the conveyor drum, wherein each can holder is linearly moveable parallel to the axis of rotation, and the conveyor drum comprises at least one actuator system, which is configured to impart a linear movement to at least one can holder.

SUMMARY OF THE INVENTION

This object is achieved with a conveyor for can blanks, having a machine frame, on which at least one conveyor drum is supported so that it can rotate about an axis of rotation, wherein the conveyor drum is provided with a plurality of can holders which are supported on an external circumferential surface of the conveyor drum, wherein each can holder is linearly movable parallel to the axis of rotation and wherein the conveyor drum comprises at least one actuator system, which s configured to impart a linear movement to at least one can holder, wherein the at least one actuator system is configured to provide the linear movement of the at least one can holder as a predefinable function of a rotational position of the conveyor drum in relation to the machine frame.

The object of the invention is to provide a conveyor which can be coupled with a plurality of processing machines and allows a flexible way of working.

This object is achieved for a conveyor of the abovementioned type by the features of claim 1. Herewith it is provided that the at least one actuator system is configured to provide the linear movement of the at least one can holder as a predefinable function of a rotational position of the conveyor drum in relation to the machine frame.

The actuator system thus allows an adaptation of the trajectories for the can holder relative to the machine frame, in order, in this way, to allow adaptation of the linear movements of the can holders to the respectively provided conveying path for the can blanks. It is optionally provided that all the can holders during one revolution of the conveyor drum about the axis of rotation follow the same trajectory, and to this end the actuator system can have a predefined geometry and be rotatably supported on the machine frame for adaptation of the trajectories. Alternatively, it is provided that groups of can holders or individual can holders are able to make individual linear movements, which by way of example can be used for isolating can blanks, by way of example in order pass as required a proportion of the can blanks from among the totality of can blanks being provided to the conveyor drum, through a first processing sequence, while the remaining proportion of the can blanks is fed to a second processing sequence. This can be achieved, by way of example, by individual influencing of the linear movement for the individual can holders and the can blanks accommodated by these. For example, it can be provided that each of the can holders is associated with a linear actuator, in particular an electrical linear actuator or a pneumatic cylinder, which by means of an appropriate valve unit can be individually controlled, in order to be able to influence the linear position of the respective can holder. In this case, through pneumatic or electrical control of the associated valve units the desired dependency of the linear movement of the respective can holder on the rotational position of the conveyor drum in relation to the machine frame is guaranteed.

Advantageous further developments of the invention are the subject matter of the dependent claims.

It is expedient if the actuator system is configured for the, in particular cyclically, recurring provision of linear movements for a plurality of, in particular all, can holders accommodated on the conveyor drum. In this way an inexpensive design for the actuator system can be implemented, since no individual provision of linear movements for the can holders is necessary. Particularly preferably, it is provided that each can holder follows the same linear trajectory during a rotation of the conveyor drum, whereby when taking account of the rotational movement of the conveyor drum there is an overlaid rotational and translational movement for the can holder, that is identical to the rotational and translational movements for all other can holders.

It is preferably provided that the actuator system comprises at least one trajectory on a circumferential surface or on a front face which is configured for an attachment or an engagement of a guidance means associated with the respective can holder. Together with the can holder, the actuator system thus forms a guide mechanism, by which a, preferably enforced, relationship between the rotation position of the conveyor drum and the linear position of the respective can holder results. It is advantageous if the trajectory is realized as a circumferential groove in an actuator system with a plain cylindrical configuration and the can holders in each case engage in this groove with a control journal, since in this way in both axial movement directions, in which the can holder is able to move, an enforced coupling between the actuator system and the can holders is guaranteed.

In an embodiment of the invention it is provided that the trajectory along a first path section, in particular over a circumference range of 180 degrees, runs in a straight line and along a second path section, in particular over a circumference range of 180 degrees, is configured as a succession of three curve sections with two inflection points. With this configuration of the trajectory, along the first path the can holders do not perform a linear movement, whereas along the second path section they perform a linear reversing movement which, by way of example, can be used for positioning a can blank on a pick-up mandrel of a conveyor chain or for removing a can blank from a pick-up mandrel of a conveyor chain. In order to guarantee a low-vibration linear transport of the can blanks the path sections configured with opposing curvatures constantly merge, wherein the transition between adjacent path sections is in each case configured as an inflection point.

In an advantageous further development of the invention it is provided that the actuator system is rotatably accommodated on the machine frame and that the actuator system is associated with a locking device for locking the actuator system to the machine frame and/or an actuating drive for adjusting the actuator system in relation to the machine frame. The supporting of the actuator system so that it can rotate in relation to the machine frame enables the desired setting of the phase position for the linear movement relative to the rotational movement of the conveyor drum, in order to ensure the desired adaptation of the movements of the can holders as a function of the desired conveying paths for the can blanks. With the locking device, once setting of the phase position has taken place the actuator system setting is guaranteed, so that during routine operation of the conveyor drum no undesired adjustment of the phase position occurs. In addition, or alternatively, an actuator can be provided, allowing an automated, independently powered setting of the phase position and which in particular is configured as an electrical gear motor. In this way, even during a conveying operation for can blanks a change in the phase position can take place, so that a dynamic adaptation of the conveying paths for the can blanks is enabled.

It is advantageous if the conveyor drum comprises a plurality of guide rods in each case aligned parallel to the axis of rotation, on which the can holders are accommodated so that they can move linearly and which together with a drum axis determine an annular interior volume, wherein the at least one actuating means is arranged in the interior volume. Here, the guide rods ensure a sliding movement guidance of the associated can holder. By arranging the actuating means in the annular interior volume, formed between the guide rods and the drum axis, a compact design of the conveyor drum can be achieved.

In a further configuration of the invention it is provided that each of the can holders is associated with at least one guide rod, provided with a fluid channel, configured for a fluidically communicating coupling of at least one fluid hole configured on the can holder with a supply channel arranged at the end of the guide rod. The can holder is preferably configured for a vacuum-aided adhesion of the can blank and to this end on a contact surface, against which the can blank comes up, has at least one fluid hole. A provision of a vacuum takes place in this case via at least one guide rod associated with the can holder, wherein the can holder is accommodated in a fluid-tight manner with a sliding movement on a guide rod and the guide rod is provided at least partially with a fluid channel, which in particular opens into a radial cross hole, with the help of which the fluidically communicating connection with the fluid hole is guaranteed.

It is expedient if the can holder comprises a fluidically-controllable actuator with an actuator element movably accommodated on the can holder, configured to provide a can pushing-off movement. The actuator thus allows a reliable release of the can blank from the contact surface on the can holder, wherein to this end an outwardly-directed radial movement of the actuator element is provided for, resulting in a tilting motion of the can, as a result of which the two-dimensional application to the contact surface is removed and a possible vacuum impingement on the contact surface has no further effect on the can blank.

In an advantageous further development of the invention it is provided that the guide rods are in each case accommodated at the end in bearing races, rotatably supported on a drum axis immovably arranged on the machine frame and that at least one bearing race is passed through by radially aligned supply channels, opening at a radial internal end area into at least one supply chamber. Accordingly, at least one of the bearing races, apart from the immovable accommodation of the guide rods, also serves for provision of a fluid flow to the guide rods or for discharge of a fluid flow from the guide rods, so that other connection means such as by way of example flexible fluid hoses for fluidic impingement of the guide rods can be dispensed with and thus a compact design of the conveyor drum is guaranteed.

It is preferably provided that the at least one supply chamber extends along a circumferential section of the axis of rotation and is accommodated on the drum axis so that it is adjustable by a swivel motion. This allows a setting of a phase position for a fluid flow to the guide rods or from the guide rods as a function of the can blanks conveyance requirements. By way of example, by adjusting the supply chamber a phase position for a suction intake of can blanks or an adjustment of a phase position for controlling the actuator for the can pushing-off movement can be set. Preferably a plurality of in particular supply chambers adjustable by a swivel motion are attached to the drum axis, which are configured for impinging different groups of supply channels with different pressure levels. In this way, an individual setting of phase positions for the discharge and/or supply of fluid flows from the can holders or to the can holders is enabled.

It is advantageous if the conveyor drum is associated with at least two means of conveyance from the group: conveyor belt with hoppers, conveyor chain with loading mandrels, loading star with fixed loading shells, loading drum with linearly-moving loading shells, manipulator with can gripper. With a conveyor belt with hoppers each of the can blanks is accommodated in an individually assigned hopper, in particular formed from a flexible material, and is fed to the conveyor drum or discharged from the conveyor drum by a rotational movement of the conveyor belt. With a conveyor chain a number of chain elements are provided, connected together, so that they can swivel, by chain rivets, wherein at least some of the chain rivets are associated with respective loading mandrels, extending along a swivel axis determined by the respective chain rivet. With a loading star a number of loading shells are arranged in a fixed arrangement and with a fixed angular spacing in relation to the axis of rotation for the loading star. With a loading drum a plurality of loading shells are arranged with a fixed angular spacing in relation to the axis of rotation for the loading drum, which are in addition able to move linearly in parallel with the axis of rotation, wherein all loading shells always follow the same, predefined trajectory. The manipulator with can gripper can in particular concern an industrial robot, allowing an individual loading or unloading of the loading drum with can blanks.

In an advantageous further development of the invention it is provided that the conveyor drum is associated with at least two loading drums, the axes of rotation of which are aligned parallel to the axis of rotation of the conveyor drum, wherein at least one of the loading drums is associated with an adjusting device for setting a distance in relation to the conveyor drum. By adjusting the distance between the axis of rotation of the loading drum and the axis of rotation of the conveyor drum influence can be exerted on whether a transfer of can blanks between conveyor drum and loading drum or loading drum and conveyor drum takes place or not, so that in this way an influence can similarly be exerted on a conveying path for the can blanks.

In a further configuration of the invention it is provided that the can holders are arranged on the conveyor drum and on the loading drums in each case with the same spacing and that a number of can holders of the conveyor drum is greater than a number of can holders on the loading drum. Through the same spacing for the arrangement of the can holders on the conveyor drum and the loading shells for the loading drums a continuous movement of the conveyor drum and the loading drums like that of a gear train is enabled, wherein in this way it is ensured that each can blank at each point in time is accommodated at least on the loading drum or on the conveyor drum. Through the larger number of can holders on the conveyor drum compared to the number of loading shells on the associated loading drum it is guaranteed that the conveyor drum is able to operate the at least two loading drums and if necessary further conveying means and thus implement the desired points function.

It is preferably provided that between the conveyor drum and the machine frame a sprocket, for a conveyor chain, is arranged coaxially to the conveyor drum and able to rotate freely and that on the machine frame a continuously rotating conveyor chain with a plurality of deflection rollers is supported, wherein adjacent to the sprocket two deflection rollers are arranged, which in each case are configured to deflect the conveyor chain in a tangential direction to the sprocket and at least one of which deflection rollers is accommodated on the machine frame with an adjustable linear movement. The freely rotatable sprocket for the conveyor chain, which surrounds the conveyor drum at least in areas, in combination with the adjusting device, the phase position of which can be set relative to the machine frame, optionally allows the attachment or not of can blanks, fed by the conveyor chain, to the can holders of the conveyor drum, whereby similarly in the sense of a points function a conveying path for the can blanks can be influenced.

BRIEF DESCRIPTION OF THE DRAWINGS

An advantageous embodiment of the invention is represented in the drawing. This shows as follows:

FIG. 5 an implementation of the outer surface of the control body according to FIG. 2;

FIG. 6 a purely schematic representation of a first phase arrangement for a vacuum impingement and an excess pressure impingement of a can holder; and FIG. 7 a purely schematic representation of a second phase arrangement for a vacuum impingement and an excess pressure impingement of a can holder.

DETAILED DESCRIPTION OF THE PREFERRED EMBODIMENTS

Figure 1:
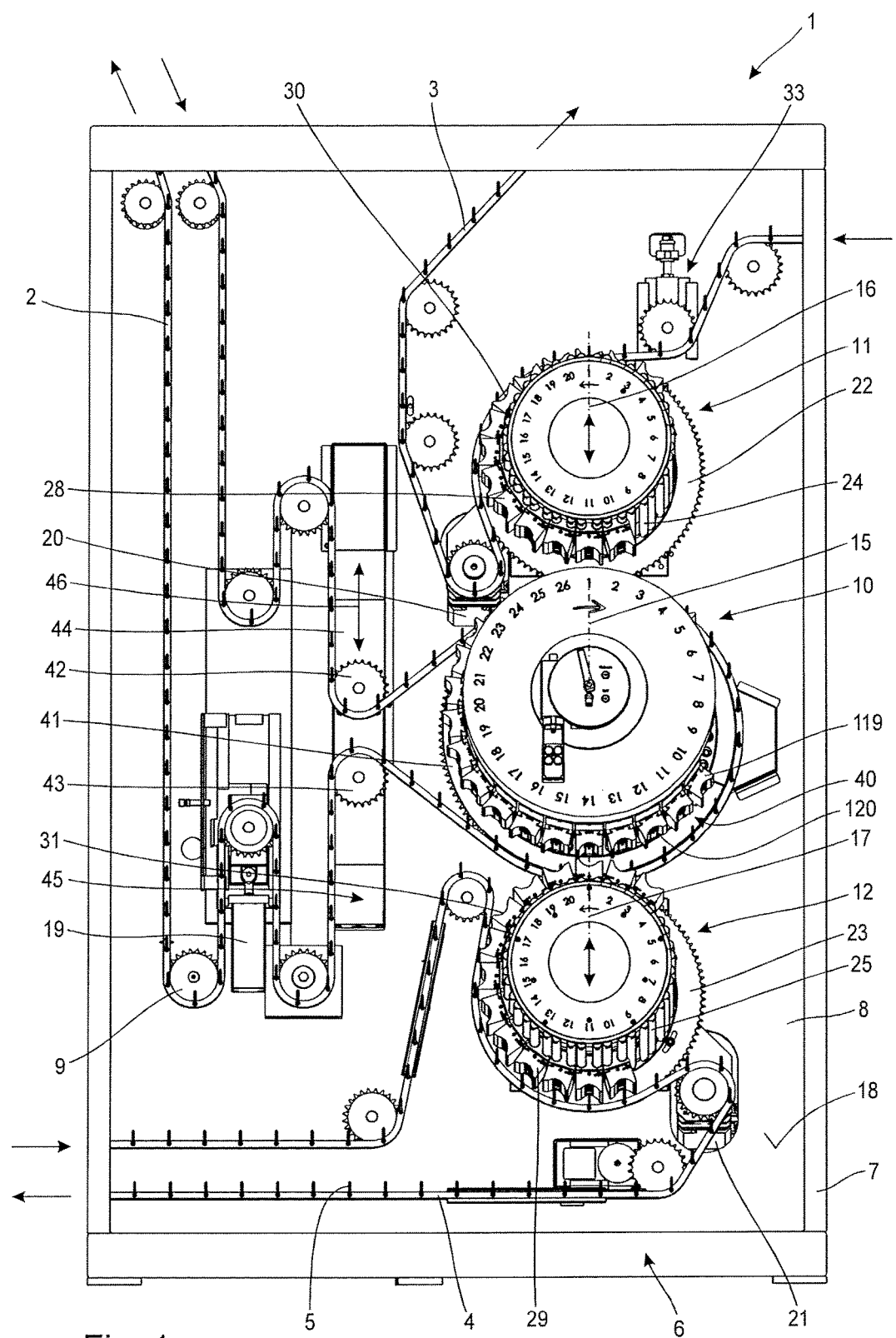
FIG. 1 a perspective front view of a conveyor with a machine frame, to which a conveyor drum, two loading drums and three conveyor chains for conveying can blanks are attached.

A conveyor 1 represented in FIG. 1 is configured for a conveyance of can blanks (not shown), in particular aerosol can blanks, metal tube blanks, plastic tube blanks and other sleeve-shaped workpieces. The conveyor 1 is furthermore configured for an arrangement between different processing machines, not shown in more detail in FIG. 1, by way of example from the group comprising: screen printing machines, digital printing machines, offset printing machines, drying ovens and washing units, to which or from which can blanks are intended to be conveyed. Here the transport of the can blanks not shown in more detail to the processing machines, similarly not shown, takes place purely by way of example with the help of different conveyor chains 2, 3, 4. Each of the conveyor chains 2, 3, 4 is respectively composed from a number of chain elements not shown in more detail, wherein the chain elements are connected together so that they can swivel by chain rivets not shown in more detail. It is, by way of example, provided that every second chain rivet is associated with a pick-up mandrel 5 serving as a loading mandrel, which extends as an elongation of an axis (not shown in more detail) of the respective chain rivet and which is provided to accommodate a can blank. Thus, the can blank (not shown), which is in particular configured as a slim, plain cylindrical metal sleeve with a concavely formed floor and an opening arranged opposite the floor, can be slid with the opening onto the respective pick-up mandrel 5. In this way, the can blank can be moved by the movement of the respective conveyor chain 2 to 4 between the processing machines (not shown) and the conveyor 1.

The job of the conveyor 1 is to pass on an optional provision of can blanks, fed by one of the conveyor chains 2 to 4 of the conveyor 1, to one of the other conveyor chains 2 to 4, so that the conveyor 1 can be operated like points, serving to influence a conveying path of the respective can blank.

The conveyor 1 comprises a machine frame 6, which purely by way of example is formed by a machine frame 7 and a support plate 8 accommodated on the machine frame 7. Here the machine frame 7 serves to support the carrier plate 8 and for coupling to the adjacently arranged processing machines (not shown). The support plate 8 carries the components of the conveyor 1 described in more detail below, in particular a plurality of deflection rollers 9 for deflecting and guiding the conveyor chains 2 to 4, the conveyor drum 10 and an upper loading drum 11 associated purely by way of example with the conveyor drum 10 and a lower loading drum 12 similarly purely by way of example associated with the conveyor drum 10. To be able to guarantee an advantageous conveyance of can blanks (not shown) by means of the conveyor 1, it is, by way of example, considered that an axis of rotation 15 of the conveyor drum 10, an axis of rotation 16 of the upper loading drum 11, an axis of rotation 17 of the lower loading drum 12 as well as the axes of rotation not described and not shown in more detail of the deflection rollers 9 are in each case aligned in parallel to one another. It is further considered that the axes of rotation 15 to 17 and the axes of rotation (not shown) of the deflection rollers 9 are in each case aligned perpendicularly to a largest surface 18 of the support plate 8.

It can furthermore be provided that the conveyor chains 2 to 4 are moved in different conveyor levels not shown in more detail, which in each case have a predefinable, in particular different, distance from the largest surface 18 of the support plate 8, wherein this serves in particular for avoidance of collisions between the individual conveyor chains 2 to 4. It is also provided, purely by way of example, that each of the conveyor chains 2 to 4 is associated with a drive motor 19, 20, 21, configured to impart a rotational movement to the respective conveyor chain 2 to 4.

It is, by way of example, provided that the loading drums 11 and 12 are in each case connected non-rotatably with a sprocket 22, 23, so that an enforced coupling between a rotational movement of the respective conveyor chain 3, 4 and the respectively associated loading drum 11, 12 is guaranteed.

The loading drums 11, 12 in each case have a circular arrangement of support tubes 24, 25 aligned parallel to one another, to each of which linearly movable loading shells 28, 29 are attached. In FIG. 1, in order to illustrate the alignment of the support tubes 24, 25, unlike when mounted in practice the loading drums 11, 12 are mounted only partly with the associated loading shells 28, 29. The support pipes 24, 25, together with a drum axis (not shown) arranged centrally in the interior of the respective loading drum 11, 12, form an annular interior volume, aligned coaxially to the respective axis of rotation 16 or 17. In the respective interior volume a control sleeve (also not shown) is arranged, comprising at least one circumferential guide curve, preferably a plurality of these aligned parallel to one another. Guide pins, similarly not shown, of the loading shells 28, 29 engage in the guide curves, to bring about an axial movement of the respective loading shells 28, 29 upon rotation of the support tubes 24, 25 of the respective loading drums 11, 12 about the respective control sleeve. Through this linear movement of the loading shells 28, 29 by way of example a removal of can blanks (not shown) from one of the conveyor chains 3 and/or 4 and/or a positioning of can blanks (not shown) on the respective conveyor chains 3, 4 can be brought about.

In order to bring about a reliable adherence of the can blanks (not shown in more detail) to the respective loading shells 28, 29, these are provided with a concavely configured contact surface 30, 31 with fluid holes not shown in more detail. Through the fluid holes a vacuum can be applied to the respective contact surfaces 30, 31, which in a manner not shown in more detail can be fed via the support tubes 24, 25 from a likewise not shown vacuum connection and through which an adherence of the can blanks at least over a section of the circular path of the loading shells 28, 29 can be guaranteed.

Purely by way of example, it is provided that the chain wheels 22, 23 of the loading drums 11, 12 are in each case wrapped around by the respective conveyor chain 3, 4 with a wrap angle of approximately 120 degrees. In the area of the wrap-around of the respective chain wheel 22, 23 by the respective conveyor chain 3, 4 by way of example a removal of can blanks from the respective conveyor chain 3, 4 and an onward transport to the adjacently arranged conveyor drum 10 or a provision of can blanks by the conveyor drum 10 to the respective loading drum 11, 12 and a positioning of the can blanks (not shown) on the associated conveyor chain 3, 4 can take place.

In order to be able to guarantee that the conveyor 1 functions advantageously as points for can blanks (not shown), the loading drums 11, 12 can in each case have their distance from the conveyor drum 10 individually adjusted. Purely by way of example, it is provided that the axes of rotation 15 to 16 of the conveyor drum 10 and of the loading drums 11 and 12 lie in a common axis and a distance adjustment for the loading drum 11 and/or for the loading drum 12 takes place along this common axis. To this end, the loading drum 11 and the loading drum 12 are associated with adjusting means not shown in more detail, by way of example a manually operated gear arrangement or an electromotively operable gear arrangement. Influencing the distance between the respective loading drum 11 and/or 12 and the conveyor drum 10 allows it to be achieved that can blanks (not shown) accommodated on the conveyor drum 10, which are not intended to be handed over to the adjacently-arranged loading drum 11 or 12, do not come into contact with the loading shells 28, 29 of the respective loading drum 11, 12. If, on the other hand, it is provided that a handover between one of the loading drums 11 and/or 12 and the conveyor drum 10 is to be carried out, a distance between the axes of rotation 15 to 17 is selected such that can blanks (not shown) adhering by vacuum to the loading shells 28 or 29 can be handed over to the conveyor drum or removed from the conveyor drum 10.

In order to be able to guarantee an advantageous feeding of the can blanks to the loading drum 11, a threaded spindle arrangement 33 is provided, through which a linear movement of the associated deflection roller 9 relative to the loading drum 11 can be brought about, whereby a tangential alignment of the conveyor chain 3 in relation to the sprocket 11 and thus a contact area for the can blank with the loading shell 28 can be set.

The can holders 40 provided on the conveyor drum 10 and described in more detail below are arranged in a circumferential direction of the conveyor drum 10 with a spacing corresponding to a spacing of the loading shells 28 and 29 of the loading drums 11, 12 and also a spacing of the pick-up mandrels 5 of the conveyor chains 2 to 4. Purely by way of example, it is provided that the conveyor drum 10 is associated with a sprocket 41, described in more detail below and which is supported on the machine frame 6 so that it can rotate freely in relation to the conveyor drum 10. The sprocket 41 is wrapped around by the associated conveyor chain 2 purely by way of example with a wrap angle of approximately 260 degrees, to which end the conveyor chain 2 is deflected with the help of deflection rollers 42, 43, belonging to the group of deflection rollers 9 arranged adjacent to the conveyor drum 10. Purely by way of example, it is provided that the deflection rollers 41, 42 are rotatably supported on a common carriage 44, which in turn is accommodated so that it can move linearly in a recess 45 of the support plate 8. The carriage 44 is associated with an adjusting device not shown in more detail, with the help of which a linear displacement of the carriage 44 along the rectilinear trajectory 46 can be carried out. Through this measure an influence can similarly be exerted on a contact point during the feeding of can blanks to the conveyor drum 10.

The conveyor drum 10, similarly to the loading drums 10, 11 has guide rods 47, 48 aligned in parallel to the axis of rotation 15, alternatingly arranged on a circular path. Purely by way of example, it is provided that the guide rods 47, 48 are used in each case in pairs for a linear support of a can holder 40.

Figure 2:
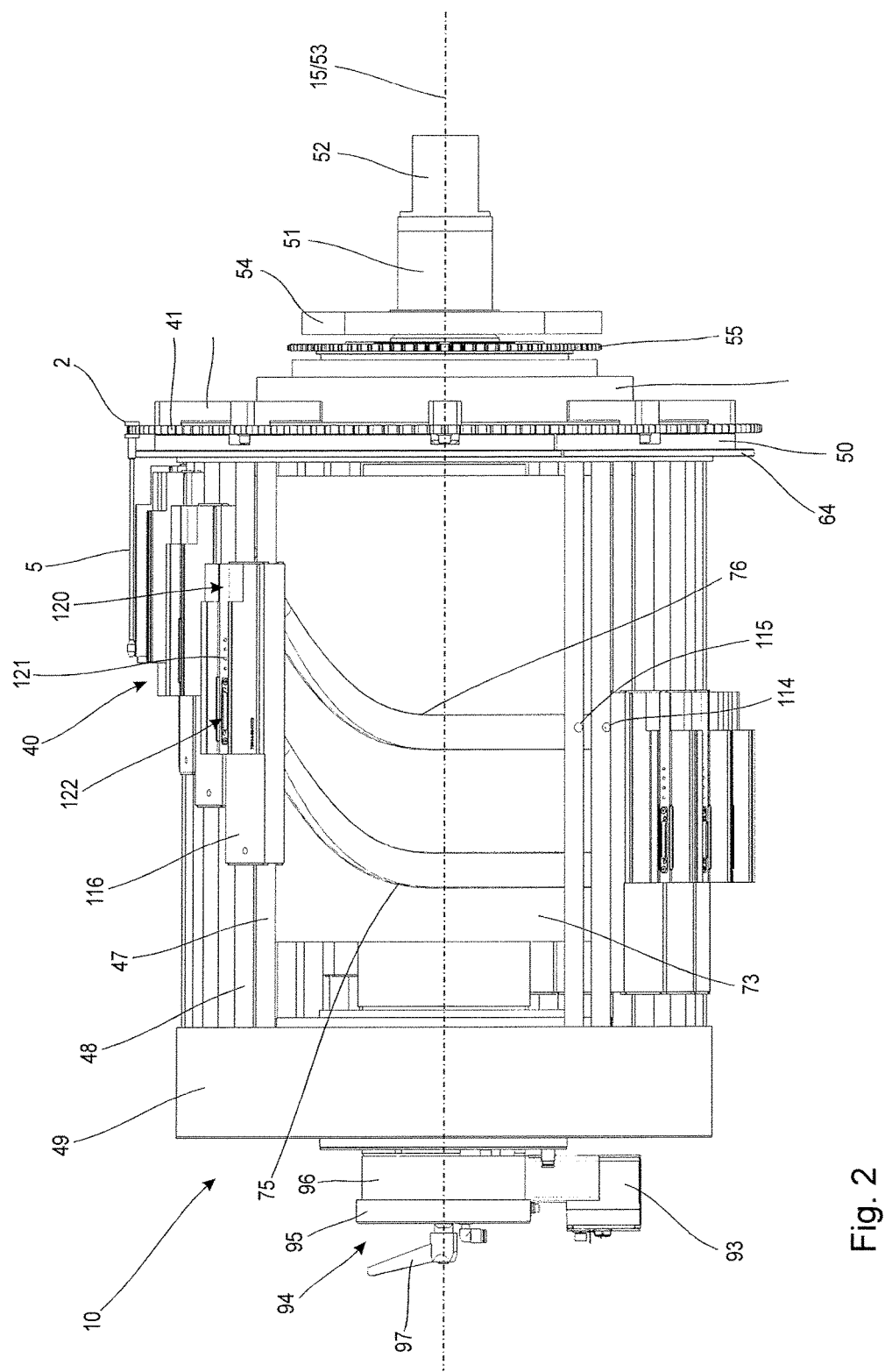
FIG. 2 a side view of the conveyor drum with partially disassembled components.
Figure 3:
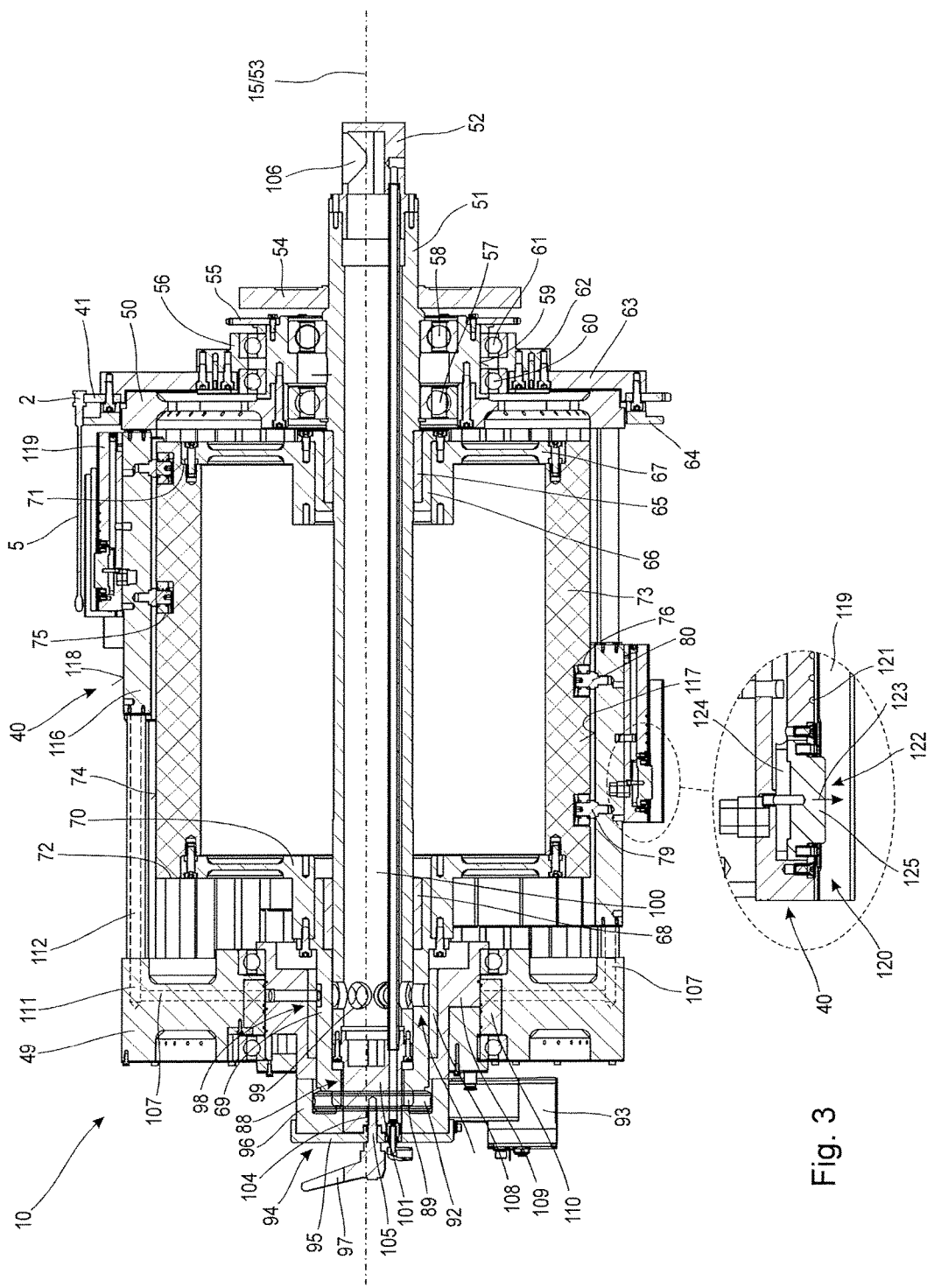
FIG. 3 a sectional view of the conveyor drum according to FIG. 2.

As can be inferred from the representations in FIGS. 2 and 3, the guide rods 47, 48 in each case extend between a bearing race 49 turned away from the support plate 8 and a bearing race 50 turned towards the support plate 8. For example, it is provided that the bearing race 50 in the axial direction has only a small extension, since in the embodiment shown of the conveyor drum 10 it performs only a mechanical protective function for the guide rods 47, 48. In contrast, the bearing race 49 in the axial direction and compared with the bearing race 50 has a larger axial extension, since it is configured, in addition to the mechanical supporting of the guide rods 47, 48, also for a phased fluid supply of the guide rods 47, 48, as described in the following.

As can be inferred from the representation in FIG. 2, the conveyor drum 10 comprises a drum axis 51, secured in a fixed manner not shown in more detail by a coupling element 52 to the support plate 8 of the machine frame 6 and which purely by way of example is aligned with a central axis 53 normally to the largest surface 18 of the support plate 8. For an advantageous supporting of the drum axis 51, adjacent to the coupling element 52 this has a purely by way of example plain cylindrical mounting flange 54, which guarantees supporting of tilting moments, acting on the conveyor drum 10, in relation to the carrier plate 8.

As an example, it is provided that the mounting flange 54 is attached as a separate ring flange to the drum axis 51 and connected preferably by friction, in particular by shrinking, or substance-to-substance bonded, in particular by welding, with the drum axis 51. In the axial direction adjacent to the mounting flange 54 a sprocket 55 is arranged.

The sprocket 55 is secured to a bearing ring 56, which in turn and purely by way of example is rotatably supported by means of two deep groove ball bearings 57, 58 on the drum axis 51. The bearing ring 56 is, in turn, securely coupled to the bearing race 49, to which the end areas of the guide rods 47, 48 are secured. On an external circumferential surface 59 the bearing ring 56 also carries two deep groove ball bearings 60, 61, the inner rings of which, not further described, are secured to the bearing ring 56, while the outer rings, similarly not further described carry a ring flange 62, which is thus supported rotatably in relation to the bearing ring 56. On a surface of the ring flange 62 turned away from the support plate 8 a ring-shaped chain wheel carrier 63 is secured, which in turn is firmly attached on a radial external surface section to the sprocket 41 and to an axially protruding support ring 64. Thanks to the deep groove ball bearings 57, 58, 60, 61 on the one hand a free rotatability of the bearing race 49 in relation to the drum axis 51 is guaranteed, and also a free rotatability of the chain wheel 41 in relation to the bearing race 49.

In the axial direction adjacent to the deep groove ball bearing 57 a bearing ring 65 is secured frictionally, by way of example by shrinking, to the drum axis 51. The bearing ring 65 is surrounded on its outer periphery by a slip ring 66, arranged coaxially to the bearing ring 65 and coupled non-rotatably with a support disc 67 similarly arranged coaxially to the bearing ring 65. Here the bearing ring 65 and the slip ring 66 are, in terms of the material selection and dimensioning, matched in such a way that they form a sliding bearing, allowing a rotational movement of the support disc 67 relative to the drum axis 51. In the axial direction spaced from the bearing ring 65 a further bearing ring 68 is secured frictionally, in particular by shrinking, to the drum axis 51, with which a further slip ring 69 and a support disc 70 coupled to the slip ring 69 are associated. In this way a further sliding bearing is formed on the drum axis 51, allowing a rotational movement of the support disc 70 in relation to the drum axis 51.

Between opposing annular surfaces 71, 72 of the support discs 67, 70 a control body 73 with purely by way of example a sleeve-like configuration, which can also be referred to as an actuator system, is arranged, connected in each case non-rotatably with the support discs 67 and 70. The control body 73, on a circumferential surface or external surface 74, is provided purely by way of example with two control grooves 75, 76 running parallel to each other and serving as trajectories for the can holders 40. The control grooves 75, 76 extend in the circumferential direction over the entire external surface 74 of the control body 73 and are identifiable both in the sectional view according to FIG. 3 and in the side view according to FIG. 2, in which for the purposes of clarity some of the guide rods 47, 48 and the associated can holders 40 are not represented.

From the sectional view of FIG. 3 it can also be identified that the can holders 40 guided on the guide rods 47, 48 in each case engage with control journals 79, 80 serving as guidance means, in the respective control groove 75, 76, whereby an enforced coupling between the can holder 40 and the control body 73 is achieved. Thanks to this enforced coupling with a suitable path of the control grooves 75, 76, as represented in more detail in FIG. 2, when there is a rotatory movement of the can holder 40 relative to the control body 73, thus through a rotational movement of the associated support bearing races 49, 50 in relation to the control body 73, a linear movement of the can holder 40 along the respective guide rods 47, 48 is achieved.

As can be inferred from the purely schematic path shown in FIG. 5 of the control grooves 75, 76 provided on the control body 73, each of the control grooves 75, 76 has by way of example a straight section 81 extending over a first half of the periphery, in particular between 0 degrees and 180 degrees, of the control body 73, serving as a path section. Each of the control grooves 75, 76 also has a curved section 82 adjacent to the straight section 81 and extending over a second half of the periphery, in particular between 180 degrees and 360 degrees, of the external surface 74 of the control body 73, serving as a further path section. Here the curved section 82 purely by way of example has three curved parts 83, 84 and 85, each also referred to as a curved section, which in each case constantly merge. In so doing, between the curved parts 83 and 84 a first inflection point 86 and between the curved parts 84 and 85 a second inflection point 87 are provided, since the curves of the curved parts 83 and 84 differ from one another and since also the curves of the curved parts 84 and 85 differ from one another. Accordingly, during a complete rotational movement about the control body 73 through engagement in the straight section 81 of the respective control groove 75, 76 a can holder 40 performs no axial relative movement along the first half of the outer periphery of the external surface 74. Conversely, when passing the second half of the external surface 74 of the control body 73, the can holder 40, thanks to the positive engagement of the control journal 79, 80 in the respective control grooves 75, 76, performs a sequence of a linear relative movement along the guide rods 47, 48 in a first movement direction and then in an opposite second movement direction.

To enable the conveyor drum 10 to function as adjustable points between the different means of conveyance, for example the conveyor chains 2, 3, 4 and the loading drums 11, 12, a rotatory adjustment described in more detail in the following for the control body 73 relative to the drum axis 51 is provided. To this end the slip ring 69 extends in the axial direction beyond the bearing ring 68 as far as an end area 88 turned away from the support plate 8. At this end area 88, the slip ring 69 is provided with a frontal, circumferential collar 89, which serves to non-rotationally accommodate a worm gear 92 shown only transparently for reasons of clarity.

The worm gear 92 in turn has an operative connection with a drive worm (not shown) aligned vertically to the axis of rotation 15, of a gear motor 93 serving as an actuator, which is in turn supported in a manner not shown in more detail for torque transmission to the drum axis 51. Through a suitable electrical control of the gear motor 93 a relative rotation of the worm gear 92 with the slip ring 69 coupled thereto and the control body 73 movably coupled via the support disc relative to the drum axis 51 can take place. In this way an adjustment of the phase position for the linear movement of the can holder 40 during the rotational movement about the control body 73 is achieved. Instead of the gear motor 93 a manual adjustment, in particular by means of a handwheel or a crank can be provided.

With the help of the gear motor 93 the phase position of the linear movement of the can holder 40 can by way of example be adjusted in such a way that the can holders 40 of the conveyor drum 10 perform a takeover of can blanks from the loading drum 11 and a handover of can blanks to the loading drum 12.

Alternatively, the phase position of the linear movement of the can holders 40 can by way of example be adjusted in such a way that the can holders 40 of the conveyor drum 10 remove the can blanks from the conveyor chain 2 and hand them over to the loading drum 12.

Alternatively, the phase position of the linear movement of the can holders 40 can by way of example be adjusted in such a way that the can holders 40 of the conveyor drum 10 perform a takeover of can blanks from the loading drum 11 and position these on the conveyor chain 2.

Alternatively, the phase position of the linear movement of the can holders 40 can by way of example be adjusted in such a way that the can holders 40 of the conveyor drum 10 remove the can blanks from the conveyor chain 2 and reposition them on the conveyor chain 2.

Upon achieving a desired rotatory positioning of the control body 73 in relation to the drum axis 51, by means of a braking device 94, comprising a brake ring 95, a brake plate 96 and a threaded tension lever 97, a locking of the swivel position set for the control body 73 in relation to the machine frame 6 can be achieved. To this end, a loose connection during the adjusting process between the control body 73 and the drum axis 51 in relation to the drum axis 51 is established. Here an axial force is introduced, which is applied through a rotational movement of the threaded tension lever 97 and which via the brake plate 96 and the brake ring 95 is transmitted to the slip ring 69.

Figure 4:
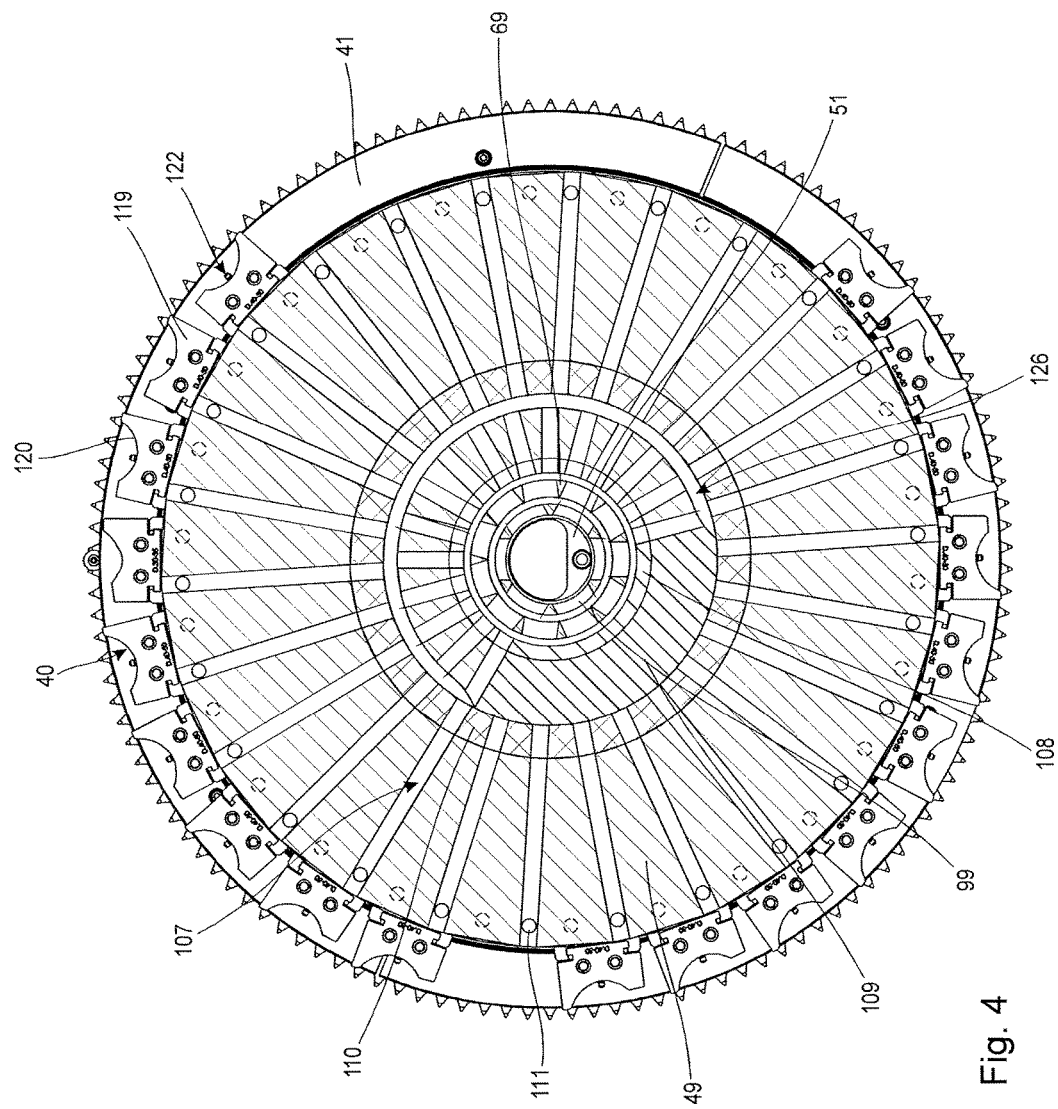
FIG. 4 a sectional view of the conveyor drum with the fluid channels configured within it.

As can also be inferred from the sectional views of FIGS. 3 and 4, the drum axis 51 on an end area 98 turned away from the support plate 8 is provided with a plurality of holes 99 in each case aligned in a radial direction, which in each case open out into a longitudinal hole 100 in the drum axis 51. The longitudinal hole 100 is sealed at the end area 98 with an end piece 101, protruding in an axial direction from the drum axis 51 and which is provided with a threaded hole 104, in which a threaded pin 105 of the threaded tension lever 97 engages. The longitudinal hole 100 further extends in the direction of the support plate 8 as far as the coupling element 52 of the drum axis 51 and opens out there into a right-angled connection hole 106. There, purely by way of example, in a manner not shown, a suction device for providing a vacuum in the longitudinal hole 100 can be connected.

From the holes 99, radial channels 107 arranged in a star shape and serving as supply channels, extend through the slip ring 69, through a bearing ring 108 surrounding the slip ring 69 on an external circumferential surface, through a support ring 109 surrounding the bearing ring 108, and through a sealing ring 110 into the bearing race 50. In the bearing race 50 the radial channels 107 open into axial channels 111, having a fluidically communicating connection with a longitudinal hole 112 of the guide rods 47 serving as a fluid channel.

As can be inferred from the sectional view of FIG. 4, the support ring 109 is passed through by the radial channels 107 only in part. The radial channels 107 configured in the support ring 109 open into a partially circular control groove 126 configured on the outer periphery of the support ring 109, which can also be referred to as a supply chamber, from where a communicating connection exists to those radial channels 107 in the sealing ring 110, which with their undesignated orifices border the control groove 126. Accordingly, the extension and relative position of the control groove 126 influence the fluid supply for the radial channels 107 in the sealing ring 110, in the bearing race 50 and thus in the longitudinal holes 112 of the guide rods 47. Since the support ring 109 can be adjusted by swivelling in a manner not shown in more detail relative to the drum axis 51 and locked, influencing of a phase position of the fluid supply for the guide rods 47 is thus guaranteed. In the same or a similar way, a fluid supply for the longitudinal holes 113 of the guide rods 48 serving as fluid channels can be implemented. Thus, preferably both a phase position for the fluid supply of the guide rods 47 and a phase position for the fluid supply of the guide rods 48 can be set at least within a predefinable phase position range.

In the course of a rotational movement of the bearing races 49, 50 with the guide rods 47, 48 arranged on them, in a given rotational position of the conveyor drum 10, therefore, by way of example only a certain group of guide rods 47 are in fluidic communication with the longitudinal hole 100, so that a vacuum impingement of the respective can holders 40, being conveyed on these guide rods 47, exists only in predefinable circumferential ranges during the rotation about the control body 73.

Purely by way of example, it is provided that the guide rods 47 can be exclusively impinged upon by a vacuum while the guide rods 48 can be exclusively impinged upon by an excess pressure. In this way, with a suitable design of the can holder 40 as a function of the rotatory position in respect of the control body 73 optionally a provision of vacuum to the can holders or an excess pressure to the can holders can be guaranteed.

To this end the guide rods 47, 48 according to the representation of FIG. 2 each have a radial hole 114, 115, through which a fluidically communicating connection with the respective longitudinal hole 112, 113 is created. The can holder 40 also comprises a sliding and fluidically sealing carrier 116 accommodated on the guide rods 47, 48, to the inner surface 117 of which turned towards the control body 73 the control journals 79, 80 are attached and which on an external surface 118 turned away from the control body 73 is provided with a carrier shell 119. The carrier shell 119 has a plain cylindrical section-shaped concave recess 120, in which a can blank (not shown in more detail) can be placed. Thanks to the profiling of the carrier shell 119 an in part two-dimensional application of the can blank to the carrier shell 119 is guaranteed. In the carrier shell 119 purely by way of example in the axial direction a plurality of suction holes 121 serving as fluid holes are incorporated, which are in fluidically communicating connection with the longitudinal hole 112 in the guide rod 47 and which as a function of the angular position of the respective can holder 40 in relation to the control body 73 are in connection with the radial channel 107 and the longitudinal hole 100 and in this way guarantee a phased application to the suction holes 121 of a vacuum.

The carrier shell 119 also comprises a fluidically operable actuator 122, configured for a radial linear movement with a short stroke and able to provide this linear movement according to the arrow 123, as soon as there is a fluidically communicating connection between a fluid hole configured below an actuator element 125, configured as a pressure chamber 124 and the radial hole 115 in the guide rod 48. Here, the longitudinal hole 113 in the guide rod 48 is fluidically coupled in a manner not shown in more detail with a compressed air supply, so that the actuator 122 can perform an ejection movement for the can blanks (not shown) accommodated in the carrier shell 119. As an example, it is provided that the actuator element 125 is held by spring means not shown in more detail in a retracted rest position and only upon application of pressure does it perform the linear movement in the outward radial direction, to achieve the detachment process for the can blank.

FIGS. 6 and 7 show different settings for the phase position of a suction phase 127, 129 and a blowing phase 128, 130, serving for operation of the actuator 122, which can be set with the help of the respective control groove 126, also referred as a supply chamber.

In the representation of FIG. 6, the suction phase 127 is designed so that can blanks conveyed by the loading drum 11 according to FIG. 1 are sucked onto the can holders 40 of the conveyor drum 10 and that the can blanks at the end of the suction phase 127 by means of the blowing phase 128, in which the actuator 122 is operated, can be delivered to the loading drum 12.

In the representation of FIG. 7, the suction phase 129 is designed so that can blanks conveyed by the loading drum 11 according to FIG. 1 are sucked onto the can holders 40 of the conveyor drum 10 and that the can blanks at the end of the suction phase 129 by means of the blowing phase 130, in which the actuator 122 is operated, can be delivered to the conveyor chain 2.

An adjustment of the suction phases 127, 129 and the blowing phases 128, 130 is in each case accompanied by an adjustment of the rotatory positioning of the control body 73 for adjusting the phase position of the linear movement for the can holder 40.

The invention claimed is:

1. A conveyor for can blanks, having a machine frame, on which at least one conveyor drum is rotatably supported about an axis of rotation, wherein the conveyor drum is provided with a plurality of can holders which are supported on an external circumferential surface of the conveyor drum, wherein each can holder is linearly moveable parallel to the axis of rotation along the external circumferential surface of the conveyor drum, and the conveyor drum comprises at least one control body, which is configured to impart a linear movement to at least one can holder and wherein the at least one control body is configured to provide the linear movement of the at least one can holder as a predefinable function of a rotational position of the conveyor drum in relation to the machine frame, and
wherein the control body comprises at least one trajectory on a circumferential surface or on a front face, which is configured for an attachment or an engagement of a guidance means associated with the respective can holder.

2. The conveyor according to claim 1, wherein the control body is configured for the recurring provision of linear movements for a plurality of can holders accommodated by the conveyor drum.

3. The conveyor according to claim 1, wherein the trajectory along a first path section runs in a straight line and, along a second path section, is configured as a succession of three curve sections with two inflection points.

4. The conveyor according to claim 1, wherein the control body is rotatably accommodated on the machine frame, and wherein the control body is associated with a locking device for locking the control body to the machine frame and/or an actuating drive for adjusting the control body in relation to the machine frame.

5. The conveyor according to claim 1, wherein the conveyor drum is associated with at least two means of conveyance from the group: conveyor belt with hoppers, conveyor chain with loading mandrels, loading star with fixed loading shells, loading drum with linearly-moving loading shells, manipulator with can gripper.

6. The conveyor according to claim 5, wherein the conveyor drum is associated with at least two loading drums the axes of rotation of which are aligned parallel to the axis of rotation of the conveyor drum, wherein at least one of the loading drums is associated with an adjusting device for setting a distance in relation to the conveyor drum.

7. The conveyor according to claim 6, wherein the can holders are arranged on the conveyor drum and on the loading drum in each case with the same spacing and that a number of can holders of the conveyor drum is greater than a number of can holders on the loading drum.

8. The conveyor according to claim 1, wherein, between the conveyor drum and the machine frame, a sprocket for a conveyor chain is arranged coaxially to the conveyor drum and able to rotate freely and wherein, on the machine frame, a continuously rotating conveyor chain with a plurality of deflection rollers is supported, wherein, adjacent to the sprocket, two deflection rollers are arranged, which in each case are configured to deflect the conveyor chain in a tangential direction to the sprocket and at least one of which deflection rollers is accommodated on the machine frame with an adjustable linear movement.

9. A conveyor for can blanks, having a machine frame, on which at least one conveyor drum is rotatably supported about an axis of rotation, wherein the conveyor drum is provided with a plurality of can holders which are supported on an external circumferential surface of the conveyor drum, wherein each can holder is linearly moveable parallel to the axis of rotation and the conveyor drum comprises at least one control body, which is configured to impart a linear movement to at least one can holder and wherein the at least one control body is configured to provide the linear movement of the at least one can holder as a predefinable function of a rotational position of the conveyor drum in relation to the machine frame, and
wherein the conveyor drum comprises a plurality of guide rods supported on the external circumferential surface of the conveyor drum, the plurality of guide rods being in each case aligned parallel to the axis of rotation, wherein the can holders are linearly movable on the guide rods, and wherein the guide rods, together with a drum axis, determine an annular interior volume, wherein the at least one control body is arranged in the interior volume.

10. The conveyor according to claim 9, wherein each can holder is associated with at least one guide rod, provided with a fluid channel, configured for a fluidically communicating coupling of at least one fluid hole configured on the can holder with a supply channel arranged at the end of the guide rod.

11. The conveyor according to claim 10, wherein the can holder comprises a fluidically-controllable actuator with an actuator element movably accommodated on the can holder, configured to provide a can pushing-off movement.

12. The conveyor according to claim 10, wherein the guide rods are in each case accommodated at the end in bearing races, rotatably supported on a drum axis immovably arranged on the machine frame and wherein at least one bearing race is passed through by radially aligned supply channels, opening at a radial internal end area into at least one supply chamber.

13. The conveyor according to claim 12, wherein the at least one supply chamber extends along a circumferential section of the axis of rotation and is attached on the drum axis so that it is adjustable by a swivel motion.

14. The conveyor according to claim 13, wherein a plurality of adjustable supply chambers are attached to the drum axis, which are configured for impinging different groups of supply channels with different pressure levels.

* * * * *